J. A. HIMMELSPACH.
DETACHABLE DIAPHRAGM FOR GAS METERS.
APPLICATION FILED JUNE 20, 1921.
1,398,722.
Patented Nov. 29, 1921.
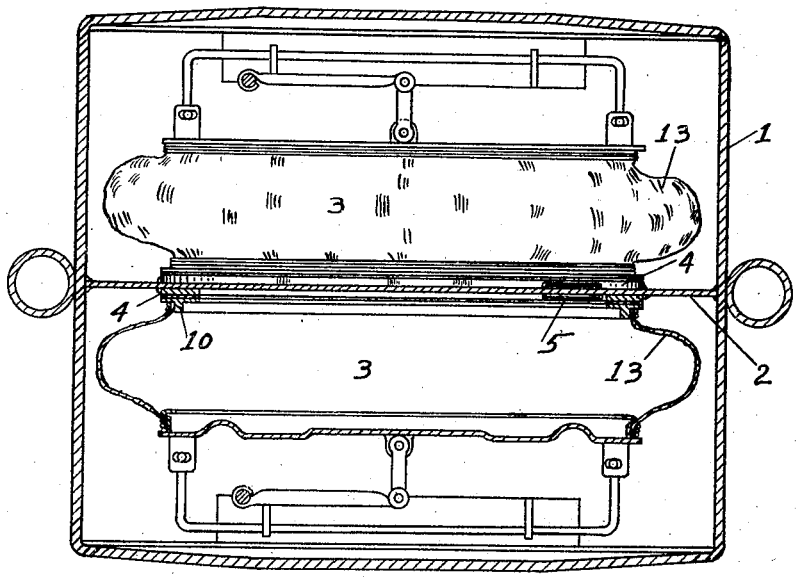
Fig. 1
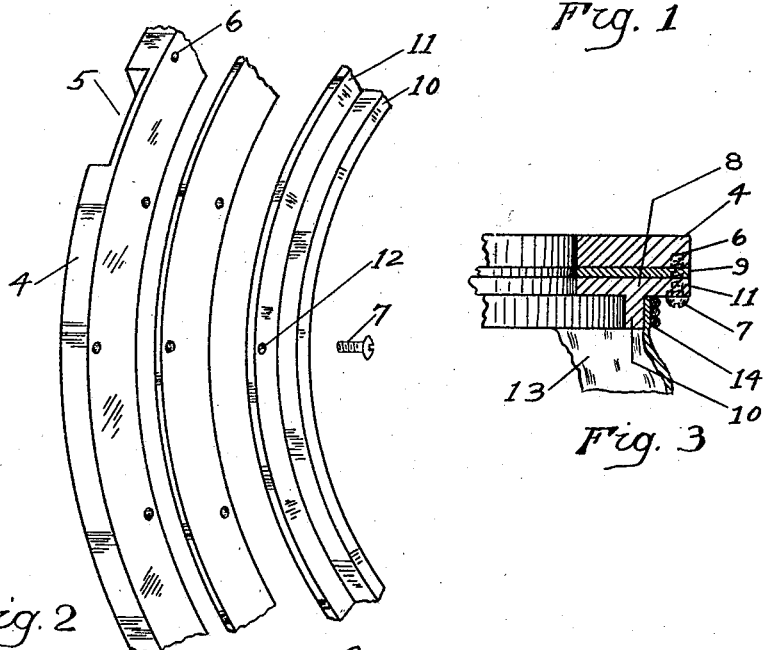
Fig. 2
Fig. 3
John A. Himmelspach
INVENTOR
Geo. B. Willcox
BY
ATTORNEY

UNITED STATES PATENT OFFICE.

JOHN A. HIMMELSPACH, OF SAGINAW, MICHIGAN.

DETACHABLE DIAPHRAGM FOR GAS-METERS.

1,398,722. Specification of Letters Patent. Patented Nov. 29, 1921.

Application filed June 20, 1921. Serial No. 479,027.

*To all whom it may concern:*

Be it known that I, JOHN A. HIMMELSPACH, a citizen of the United States, residing at Saginaw, in the county of Saginaw and State of Michigan, have invented certain new and useful Improvements in Detachable Diaphragms for Gas-Meters; and I do hereby declare the following to be a full, clear, and exact description of the invention, such as will enable others skilled in the art to which it appertains to make and use the same.

This invention relates to gas meters and pertains more particularly to an improved construction of the bellows or expansible diaphragm device in a gas meter whereby the objects of my invention are attained.

These objects are, first, to provide a simple, strong and durable means of mounting the gas meter diaphragm on the diaphragm partition, the said means being so constructed and arranged that the diaphragm attachment serves not only as an annular reinforcement for the middle partition of the meter, but also provides convenient means for the intake of gas into the diaphragm through the reinforcing ring, thereby simplifying the construction of the meter partition.

A further object is to provide a connection between the meter diaphragm and the partition on which it is mounted, making it possible to easily and quickly remove the diaphragm from the partition and to replace it with a new diaphragm, assuring a tight joint, the tightness of which does not depend upon screw threads formed upon the diaphragm plates and consequently upon the tightness with which the diaphragm is screwed on the partition.

It has been found in practice that diaphragms having screw thread bosses which require the diaphragm to be rotated and screwed into place sometimes do not permit a tight joint to be formed when the diaphragm levers and operating mechanism are in proper register to be connected to the diaphragm.

In my improved construction, I, therefore, provide a fastening means which enables the diaphragm to be easily and quickly secured to the partition without the necessity for turning or rotating the diaphragm itself and, therefore, it is only necessary to place the diaphragm upon a partition and secure it, and the connecting parts and levers will always be found to be in proper register and ready to connect up for operation of the meter.

With these and certain other objects in view which will appear later in the specification, my invention comprises the devices described and claimed and the equivalents thereof.

In the drawings, Figure 1 is a horizontal section through a gas meter embodying my improvement.

Fig. 2 is a fragmentary view of the base ring gasket and diaphragm ring of my improved construction in position ready to be assembled.

Fig. 3 is an enlarged sectional detail of the ring joint assembled.

In the drawings, 1 is the case of a gas meter of any usual or suitable type, to which my improvement may be applied. 2 is the central vertical partition, to which are secured the two expansible diaphragms or bellows 3, 3, one on each side.

The details of the operating mechanism of the meter are not shown, since my present invention pertains solely to the means for attaching the diaphragms 3, 3 to the partition 2.

4 is the base ring, which may be made of brass, aluminum, or any suitable material, and secured by solder or otherwise, to the partition 2. In the base ring is formed a channel 5 adapted, when the ring is assembled on the partition, to form a gas passage for the intake of gas into the diaphragm from the space around the diaphragm.

6 indicates a plurality of threaded openings formed in the base ring adapted to receive screws 7 by which the diaphragm ring 8 and an intermediate gasket 9 are fastened to the base ring 4.

The diaphragm ring is preferably of L-shaped cross section comprising a central boss 10 and a laterally extending flange 11 formed with openings 12 through which the screws 7 are inserted.

The boss 10 of the diaphragm ring receives the edge of the flexible bellows 13 and this edge is bound in place on the boss by cords 14, or their equivalent, and is preferably also cemented to form a gas-tight joint.

After having secured the base ring 4 to the partition 2 by solder or otherwise, the gasket 9 and diaphragm ring 8 with its flexible bellows can be quickly secured to the base ring by means of screws 7, and when it becomes necessary to replace the flexible bellows, the bellows may be quickly removed by taking out the screws 7, thus enabling the diaphragm ring to be separated from the base ring. A new bellows may then be quickly and easily bound upon the boss 10 and the diaphragm device may then be put in place in the meter without disturbing the working relation between the meter, lever mechanisms and the diaphragm.

When the diaphragm has been removed, the large opening presented by the diaphragm ring enables all of the interior surface of the flexible bellows 13 to be thoroughly examined for leaks or defects, and if a small defect exists it can be easily repaired, as the diaphragm ring 8 is of large diameter and permits the hand of the workman to be easily inserted into the bellows.

By the means above described I have produced a simple, inexpensive and effective device for removably connecting the bellows of a gas meter to the partition walls of the meter in such manner that the parts can be readily assembled and disassembled, and whereby the main partition of the meter is strengthened and stiffened, and when a new bellows is inserted to replace an old one, the same ring may be used over again.

Having thus described by invention, what I claim and desire to secure by Letters Patent is:

In a gas meter including a partition and flexible bellows, means removably securing said bellows to said partition, said means comprising a base ring having a channel formed therein, said base ring secured to said partition, a diaphragm ring registering with said base ring and adapted to be secured thereto, said diaphragm ring having a laterally extending flange and an axially extending boss, the edge of said bellows secured to said boss, and means for removably securing said diaphragm ring to said base ring, for the purposes set forth.

In testimony whereof I affix my signature.

JOHN A. HIMMELSPACH.